Figure 1:
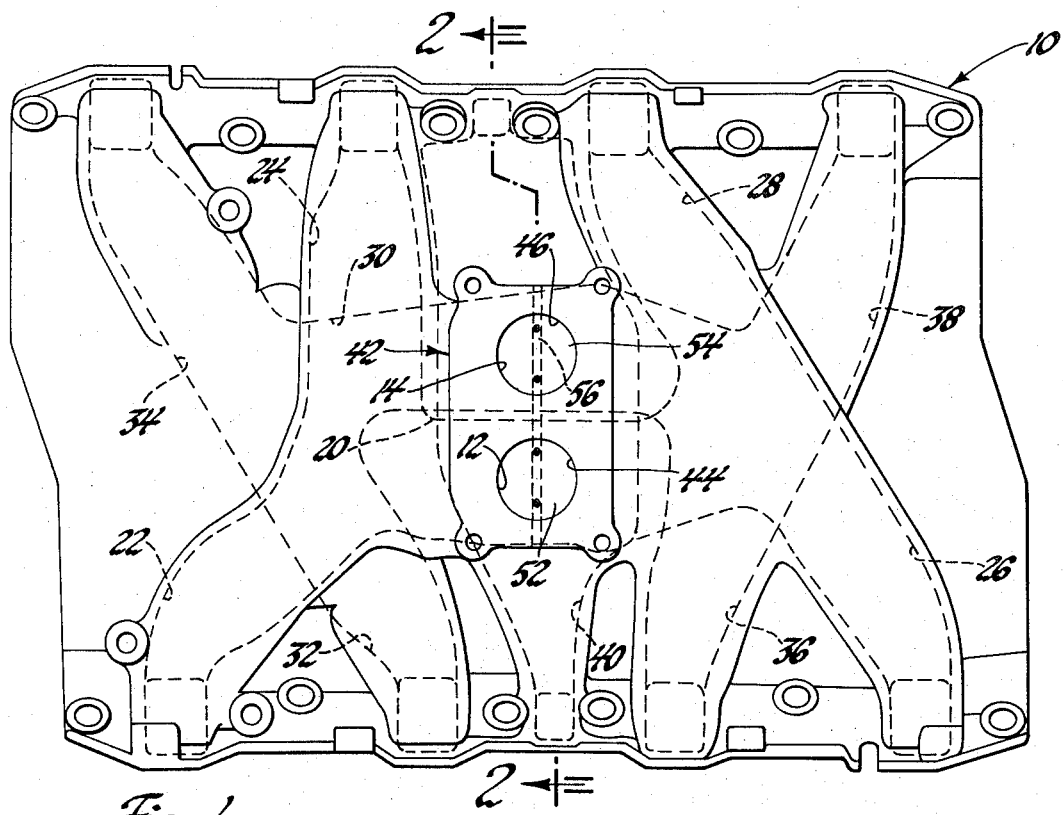

United States Patent [19]
Kuehl

[11] 3,820,514
[45] June 28, 1974

[54] EXHAUST GAS RECIRCULATION CONTROL

[75] Inventor: Paul B. Kuehl, South Bend, Ind.

[73] Assignee: General Motors Corporation, Detroit, Mich.

[22] Filed: Mar. 29, 1973

[21] Appl. No.: 346,073

[52] U.S. Cl.............................. 123/119 A
[51] Int. Cl............................... F02m 25/06
[58] Field of Search........................ 123/119 A

[56] References Cited
UNITED STATES PATENTS

| | | | |
|---|---|---|---|
| 3,579,981 | 5/1971 | Gau | 123/119 A |
| 3,641,989 | 2/1972 | Hill | 123/119 A |
| 3,749,071 | 7/1973 | Gumbleton et al. | 123/119 A |
| 3,507,260 | 4/1970 | Walker | 123/119 A |

Primary Examiner—Manuel A. Antonakas
Attorney, Agent, or Firm—C. K. Veenstra

[57] ABSTRACT

A control valve assembly, responsive to induction passage mass air flow, controls recirculation of exhaust gases from the intake manifold exhaust crossover passage to the intake manifold induction passages.

5 Claims, 2 Drawing Figures

PATENTED JUN 28 1974    3,820,514

EXHAUST GAS RECIRCULATION CONTROL

This invention relates to exhaust gas recirculation and more particularly to a novel valve assembly designed to control recirculation of exhaust gases.

A variety of systems have been proposed for recirculating internal combustion engine exhaust gases to the engine induction system. The recirculated exhaust gases, together with the residual exhaust gases in the combustion chamber, dilute the air fuel mixture to inhibit formation and emission of oxides of nitrogen.

In general, those systems attempt to proportion the flow of exhaust gases to the flow of combustion air through the induction system. Thus valves controlling the flow of recirculated exhaust gases have been positioned in response to variables such as throttle position, induction passage venturi vacuum, induction passage vacuum at a throttle traversed port, manifold vacuum, and exhaust back pressure.

This invention provides an exhaust gas recirculation control which proportions the flow of recirculated exhaust gases to induction air flow and which requires neither linkage to the throttle nor pressure nor vacuum passages for its effective operation. This control employs an air valve at the inlet to the induction manifold plenum which is positioned to maintain a slight, substantially constant pressure differential thereacross. The air valve position is an indication of the area available for induction air flow about the air valve and thus, in view of the constant pressure differential, is an indication of the rate of induction air flow. The air valve is mechanically linked to a tapered valve member which controls recirculation of exhaust gases and thereby proportions the rate of recirculation to the rate of induction air flow.

Figure 2:
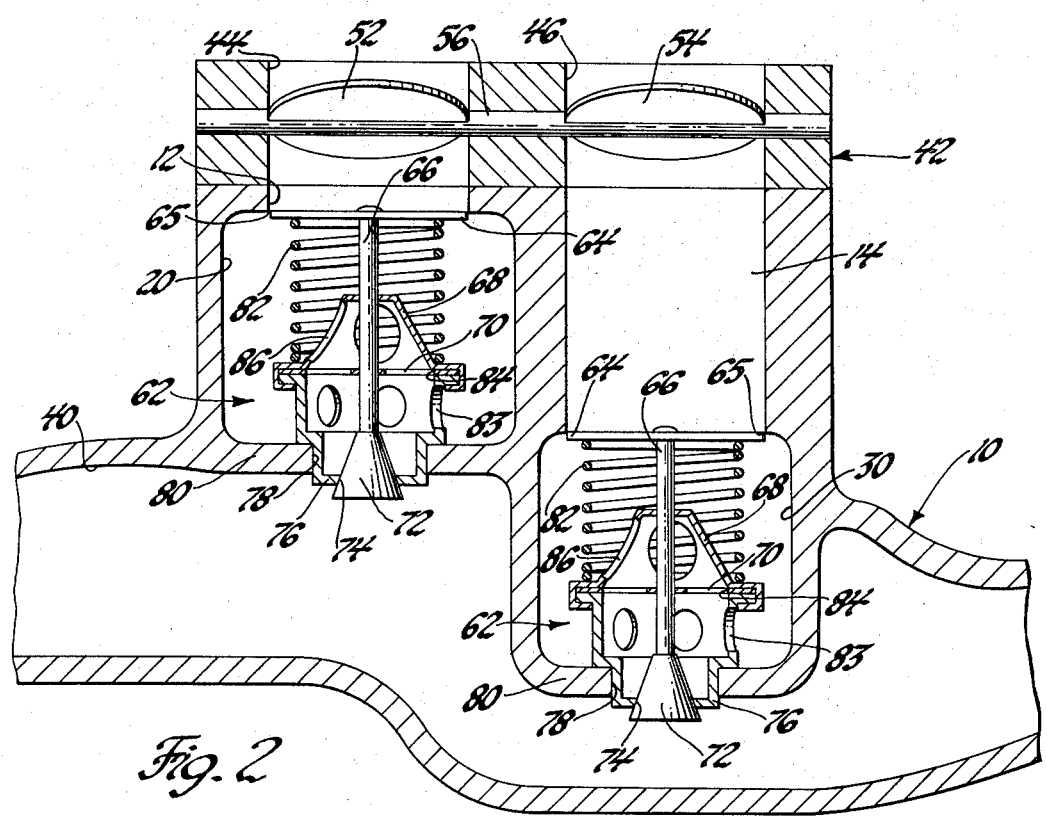

The details as well as other objects and advantages of this invention are set forth in the remainder of the specification and are shown in the drawing, in which:

FIG. 1 is a top plan view of a V-8 engine intake manifold containing induction passages and an exhaust crossover passage, together with a throttle body; and FIG. 2 is a sectional view, taken generally along line 2—2 of FIG. 1, showing the induction passage plenums and the exhaust crossover passage together with the air flow responsive exhaust gas recirculation control units.

Referring to the drawing, an internal combustion engine intake manifold 10 has a pair of vertical riser bores 12 and 14. Riser bore 12 opens to an upper horizontal plenum 20 connected forwardly (leftwardly as viewed in FIG. 1) to a pair of transverse runners 22 and 24 and connected rearwardly (rightwardly as viewed in FIG. 1) to another pair of transverse runners 26 and 28. Similarly, riser bore 14 opens to a lower horizontal plenum 30 connected forwardly to a pair of transverse runners 32 and 34 and rearwardly to another pair of transverse runners 36 and 38.

An exhaust crossover passage 40 extends transversely beneath plenums 20 and 30 and receives a portion of the exhaust gases discharged from the engine combustion chambers.

A throttle body 42 is secured on manifold 10 and has throttle bores 44 and 46 which are extensions of riser bores 12 and 14, respectively, of manifold 10. Throttle bores 44 and 46 contain throttles 52 and 54 disposed on a throttle shaft 56. Throttle bores 44 and 46, riser bores 12 and 14, manifold plenums 20 and 30, and runners 22, 24, 26, 28, 32, 34, 36 and 38 comprise an induction passage system for combustion air flow to the engine.

Referring now particularly to FIG. 2, a pair of identical exhaust gas recirculation control units 62 are provided. The description will progress with reference to the unit associated with riser bore 12 and plenum 20, but it should be appreciated that the description is also fully applicable to the unit associated with riser bore 14 and plenum 30. Control unit 62 has an air valve in the form of a flat disc member 64 disposed at the juncture 65 between riser bore 12 and plenum 20. Air valve 64 is supported on a stem 66 which is guided in a pair of apertured webs 68 and 70.

A tapered exhaust gas recirculation control valve pintle 72 is secured to the lower end of stem 66 and cooperates with the orifice defined by a valve seat 74 formed in a valve base member 76 secured in an opening 78 in the manifold floor 80 between exhaust crossover passage 40 and induction plenum 20.

Air valve 64 is approximately the same diameter as riser bore 12 and moves downwardly against the bias of a spring 82 as induction air flows through riser bore 12 into plenum 20. Spring 82 controls air valve 64 so that a slight, substantially constant pressure differential is created between riser bore 12 and plenum 20.

With a constant pressure differential across air valve 64, induction air flow past air valve 64 is proportional to the cylindrical flow area defined between the rim of valve 64 and the rim of riser bore 12. Since this area is proportional to the axial displacement of valve 64 from juncture 65 between riser bore 12 and plenum 20, the position of air valve 64 provides an indication of the rate of air mass flow through the induction system.

As air valve 64 moves downwardly upon an increase in air flow, pintle 72 is displaced from valve seat 74 to permit recirculation of exhaust gases from exhaust crossover passage 40, through valve seat 74 and apertures 83, 84 and 86 in base member 76 and webs 68 and 70, to induction plenum 20. Pintle 72 may be contoured as desired to vary the exhaust gas flow area through seat 74 in accordance with air flow area about air valve 64.

It will be appreciated, therefore, that this invention provides a means of proportioning recirculation of exhaust gases to induction air flow without requiring pressure or vacuum conduits or linkage to the throttle.

It is recognized, of course, that variations in exhaust back pressure in exhaust crossover passage 40 and in manifold pressure in plenum 20 will effect the rate of exhaust gas recirculation. This effect may be minimized over certain ranges of operation, if desired, by establishing a critical flow regime through seat 74. Further, to the extent that compensation for pressure effects is not provided, the pressure related variations in the rate of exhaust gas recirculation approximates those in commercial exhaust gas recirculation systems in which the valve is positioned in response to the vacuum created at a throttle traversed induction passage port.

The embodiments of the invention in which an exclusive property or privilege is claimed are defined as follows:

1. An internal combustion engine comprising an induction passage for air flow to the engine, an exhaust passage for exhaust gas flow from the engine, opening means connecting said exhaust passage and said induction passage for recirculation of exhaust gases from said exhaust passage to said induction passage, a control valve in said opening means movable to various positions for varying the exhaust gas flow area therethrough to thereby control recirculation of exhaust gases, an air valve in said induction passage movable to various positions for varying the air flow area therethrough, means positioning said air valve to maintain a substantially constant pressure differential thereacross whereby the position of said air valve is a measure of the rate of air flow through said induction passage, and means linking said air valve and said control valve for simultaneous movement whereby the position of said control valve is determined by the rate of air flow through said induction passage and recirculation of exhaust gases is appropriately controlled in accordance therewith.

2. An internal combustion engine comprising an induction passage for air flow to the engine, a throttle disposed in said induction passage for controlling air flow therethrough, an exhaust passage for exhaust gas flow from the engine, opening means connecting said exhaust passage and said induction passage downstream of said throttle for recirculation of exhaust gases from said exhaust passage to said induction passage, a control valve in said opening means movable to various positions for varying the exhaust gas flow area therethrough to thereby control recirculation of exhaust gases, an air valve disposed in said induction passage downstream of said throttle and movable to various positions for varying the air flow area therethrough, means positioning said air valve to maintain a substantially constant pressure differential thereacross whereby the position of said air valve is a measure of the rate of air flow through said induction passage, and means linking said air valve and said control valve for simultaneous movement whereby the position of said control valve is determined by the rate of air flow through said induction passage and recirculation of exhaust gases is appropriately controlled in accordance therewith.

3. An internal combustion engine comprising an induction passage for air flow to the engine, said induction passage including a plenum chamber and a riser bore opening into said plenum chamber at the juncture therebetween an exhaust passage for exhaust gas flow from the engine, opening means connecting said exhaust passage and said induction passage for recirculation of exhaust gases from said exhaust passage to said induction passage, a control valve in said opening means movable to various positions for varying the exhaust gas flow area therethrough to thereby control recirculation of exhaust gases, an air valve in the form of a flat disc member disposed in said induction passage at said juncture and reciprocable to various positions for varying the air flow area therethrough, means positioning said disc member to maintain a substantially constant pressure differential thereacross whereby the position of said disc member is a measure of the rate of air flow through said induction passage, and means linking said disc member and said control valve for simultaneous movement whereby the position of said control valve is determined by the rate of air flow through said induction passage and recirculation of exhaust gases is appropriately controlled in accordance therewith.

4. An internal combustion engine comprising an induction passage for air flow to the engine, said induction passage including a plenum chamber and a riser bore opening into said plenum chamber at the juncture therebetween, an exhaust passage for exhaust gas flow from the engine, opening means connecting said exhaust passage and said plenum chamber for recirculation of exhaust gases from said exhaust passage to said induction passage, said opening means being coaxial with said riser bore, an orifice member disposed in said opening means, a control valve pintle reciprocable in said orifice member for varying the exhaust gas flow area therethrough to thereby control recirculation of exhaust gases, a flat disc member disposed in said induction passage at said juncture and reciprocable to various positions for varying the air flow area therethrough, spring means biasing said disc member toward said riser bore and positioning said disc member to maintain a substantially constant pressure differential thereacross whereby the position of said disc member is a measure of the rate of air flow through said induction passage, and a stem linking said disc member and said pintle for simultaneous movement whereby the position of said pintle is determined by the rate of air flow through said induction passage and recirculation of exhaust gases is appropriately controlled in accordance therewith.

5. An internal combustion engine comprising an induction passage for air flow to the engine, a throttle disposed in said induction passage for controlling air flow therethrough, said induction passage including a plenum chamber downstream of said throttle and a riser bore extending from said throttle and said plenum chamber at the juncture therebetween, an exhaust passage for exhaust gas flow from the engine, opening means connecting said exhaust passage and said plenum chamber for recirculation of exhaust gases from said exhaust passage to said induction passage, said opening means being coaxial with said riser bore, an orifice member disposed in said opening means, a control valve pintle reciprocable in said orifice member for varying the exhaust gas flow area therethrough to thereby control recirculation of exhaust gases, a flat disc member disposed in said induction passage at said juncture and reciprocable to various positions for varying the air flow area therethrough, spring means biasing said disc member toward said riser bore and positioning said disc member to maintain a substantially constant pressure differential thereacross whereby the position of said disc member is a measure of the rate of air flow through said induction passage, and a stem linking said disc member and said pintle for simultaneous movement whereby the position of said pintle is determined by the rate of air flow through said induction passage and recirculation of exhaust gases is appropriately controlled in accordance therewith.

* * * * *